United States Patent
Vliegen et al.

(12) 
(10) Patent No.: US 6,284,038 B1
(45) Date of Patent: *Sep. 4, 2001

(54) PROCESS FOR THE CONVERSION OF IRON BEARING RESIDUES INTO A SYNTHETIC ROCK

(75) Inventors: Jan Vliegen, Lichtaart; Andre Vandenbranden, Overpelt, both of (BE)

(73) Assignee: N.V. Union Miniere S.A., Brussels (BE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,944
(22) PCT Filed: Sep. 22, 1997
(86) PCT No.: PCT/EP97/05323
  § 371 Date: Mar. 24, 1999
  § 102(e) Date: Mar. 24, 1999
(87) PCT Pub. No.: WO98/14410
  PCT Pub. Date: Apr. 9, 1998

(30) Foreign Application Priority Data

Sep. 30, 1996 (EP) .................................................. 96202728

(51) Int. Cl.$^7$ ..................................................... C04B 18/14
(52) U.S. Cl. ............................................................. 106/789
(58) Field of Search ...................................... 106/745, 789

(56) References Cited

U.S. PATENT DOCUMENTS 5,067,981 * 11/1991 Hooykaas ............................. 106/790

FOREIGN PATENT DOCUMENTS

| 39 15 373 | 12/1989 | (DE) . |
| 3915373 | * 12/1989 | (DE) . |
| 2137186 | * 10/1984 | (GB) . |
| 21 37 186 | 10/1984 | (GB) . |
| 53-037195 | * 4/1978 | (JP) . |
| 02233539 A | * 12/1990 | (JP) . |
| 77-44550 | * 5/1977 | (WO) . |
| 77-44550Y | 5/1977 | (WO) . |

OTHER PUBLICATIONS

PAJ, vol. 014, No. 544 (C–0784), Dec. 4, 1990, and JP 02 233 539A.

* cited by examiner

Primary Examiner—Paul Marcantoni
(74) Attorney, Agent, or Firm—Antonelli, Terry, Stout & Kraus, LLP

(57) ABSTRACT

A process for the conversion of iron bearing residues from the non-ferrous process industry into a synthetic rock, comprising the following steps: 1 part of the wet residue is mixed with at least 0.1 parts by weight of crushed blast furnace slags and with at least 0.1 parts by weight of crushed converter slags; water is added to the mixture to obtain a stiff paste; and the paste is allowed to harden, while kept wet, to such an extent that the resulting rock is usable for construction purposes.

16 Claims, No Drawings

PROCESS FOR THE CONVERSION OF IRON BEARING RESIDUES INTO A SYNTHETIC ROCK

FIELD OF THE INVENTION

This invention relates to a process for the conversion of iron bearing residues from the non-ferrous process industry into a synthetic rock.

BACKGROUND AND SUMMARY OF THE INVENTION

Iron bearing residues are a typical by-product of the non-ferrous industry, particularly of the zinc processing industry. Indeed, a well-known technique of zinc production encompasses the electrolysis of a zinc sulfate solution. One of the main impurities that has to be removed from the solution before electrolysis is iron. To this end, iron is precipitated and separated from the zinc solution, forming an iron bearing residue. This residue contains the major part of the iron initially present in the solution, a significant amount of lead, arsenic, silica, and residual zinc. Depending upon the conditions prevailing before and during the separation, the iron in the residue is obtained as jarosite, goethite, hematite or magnetite. Particularly jarosite and goethite have no commercial value and are considered as hazardous waste. The waste disposal sites are to be severely controlled and protected against impregnation by the leachate.

Stabilization and solidification of hazardous industrial waste is a widespread environmental technique, generally described in "Stabilizing hazardous waste", J. R. Conner, Chemtech, December 1993, pp. 35–44. Most inorganic stabilization and solidification techniques use pozzolanic reactions, i.e. reactions of the type occurring in Portland Cement, forming complex hydrated systems between CaO, $Al_2O_3$, $SiO_2$, MgO and $Fe_2O_3$.

A known application of this technique in the zinc industry is described in EP-A-0031667. This document deals specifically with the treatment of jarosite, and proposes a method of solidifying it by admixture with calcium containing cement powder and a powder based on alumina and silica (fly-ash). The product has a claimed compressive strength of 0.64 $MNm^{-2}$ after 28 days of hardening and exhibits low leachability.

This jarosite treatment process has however certain disadvantages:
- the obtained product has a relatively low compressive strength making the product suitable for piling but unsuitable for the building industry;
- the important issue of the leachability of lead is not mentioned; and
- a substantial amount of Portland Cement is added which degrades the economy of the process.

The purpose of the present invention is to bring a process for the conversion of iron bearing residues from the non-ferrous industry into a synthetic rock, which avoids the disadvantages of the process disclosed in EP-A-0031667.

To this end, according to the invention:
- a mixture is prepared consisting essentially of 1 part of the wet residue mixed with at least 0.1 parts by weight of crushed blast furnace slags and with at least 0.1 parts by weight of crushed converter slags;
- water is added to the mixture to obtain a stiff paste; and
- the paste is allowed to harden, while kept wet, to such an extent that the resulting rock is usable for construction purposes.

DETAILED DESCRIPTION OF THE INVENTION

It has been found, indeed, that blast furnace slags and converter slags, which are by-products of the iron and steel manufacturing industry, act as particularly effective pozzolan reactants when mixed with the iron bearing residues: after hardening, a product is obtained with an extreme hardness, comparable to the hardness of concrete; this product exhibits moreover a very low leachability, a low porosity and good frost resistance so that it is suitable for construction purposes.

Needless to say, blast furnace and converter slags of the iron and steel industry are very cheap reactants. In fact, converter slags are wastes without market value: having found an application for these slags is an additional benefit to the environment.

Of particular interest is the low leachability of lead that would otherwise have a hazardous environmental impact and prohibit the use of the product as a building material. It is believed that the lead insolubility is due to the presence of sulfides in the blast furnace slags. The claimed process thus not only results in the encapsulation of the residue, but it also realizes a chemical bond between at least some components.

It should be mentioned here that in JP-02-233539-A a blast furnace slag is mixed with a steel mill slag to form a slag block with addition of Portland cement. Also in JP-52-058728-A mortar is obtained by mixing a blast furnace or converter slag with (a) a blast furnace slurry and an alkaline stimulant, and (b) an industrial waste slurry. In DE-A-3915373 on the other hand converter slag is mixed with waste from a steel or power plant to obtain material for road construction. In GBA-2137186 road c construction material is obtained by mixing pozzolana or blast furnace slag, together with steel making slag and a filler material.

The residue, e.g. goethite, is supposed to be well washed, this step being an integral part of the zinc processing flow sheet. The purpose of this washing step is recuperate residual soluble zinc and to recycle it directly to the zinc plant.

The slags are advantageously crushed to a particle size of less than 500 $\mu$m; less than 250 $\mu$m is preferred and less than 125 $\mu$m is even more preferred. Coarser particle sizes are less s reactive but are however allowed to coexist with the finer sizes as they become mechanically embedded in the product.

The furnace slags generally h have a relatively low free CaO content due to high $Al_2O_3$ and high $SiO_2$ contents which are well known to bind CaO. Typical concentration ranges in blast furnace slags are (in wt. %): 25 to 45 $SiO_2$; 6 to 20 $Al_2O_3$; 0 to 5 Fe; 0 to 10 MnO; 30 to 50 CaO; 2 to 11 MgO; and 0.1 to 5 sulfide.

Converter slags generally have a relatively high free CaO content due to low $Al_2O_3$ and low $SiO_2$ contents. Typical concentration ranges in converter slags are (in wt. %): 5 to 25 $SiO_2$; 0 to 5 $Al_2O_3$; 5 to 25 Fe; 2 to 15 MnO; 30 to 60 CaO; and 0 to 5 MgO.

The total of blast furnace slags and converter slags is preferably at least 0.4 parts per part of wet residue. Very good results are obtained when using at least 0.2 parts of blast furnace slags and at least 0.2 parts of converter slags per part of wet residue. The best results are obtained, however, by using at least 0.4 parts of blast furnace slags and at least 0.4 parts of converter slags per part of wet residue.

It is not advisable to use more than 2 parts of each of both slags per part of wet residue, because this would unduly increase the investment costs for the equipment required for carrying out the process of the invention. It is even preferred to use no more than 1 part of each of both slags per part of wet residue, and still more preferred to use not more than 0.8 parts of each of both slags per part of wet residue.

In order to shorten the hardening time, it may be useful to add up to 0.1 part of cement, especially Portland Cement, either to the mixture, or to the paste.

The synthetic rock obtained by the process of the invention can be used as such, e.g. in barrage construction. It also can be crushed to yield gravel, which can be used in road construction, or for the production of concrete for the building industry.

In a special embodiment of the process of the invention, the paste is allowed to harden partially, is then broken down to a suitable size, e.g. to gravel size, and then allowed to harden completely.

The hardening is preferably carried out while the paste is immersed under water.

The present invention relates also to the construction material containing the synthetic rock produced by the process of the invention.

The invention will now be illustrated with the following examples.

The blast furnace slags used in the examples are classic slags produced by the iron and steel industry. The converter slags used are produced by the, Linz and Donawitz (LD) converter process. Throughout these examples, slags conforming to the analyses given in Table 1 are used, and goethite conforming to the analysis given in Table 2 is used. The goethite has 45% humidity by weight.

TABLE 1

Slag analyses wt. % on dry

| Component | Blast furnace slag | Converter slag |
|---|---|---|
| $SiO_2$ | 30.4 | 13.3 |
| $Al_2O_3$ | 10 | 1.43 |
| Fe | 2.3 | 18 |
| MnO | .18 | 3.8 |
| CaO | 43 | 51 |
| MgO | 9.29 | 1.7 |
| $P_2O_5$ | <0.005 | 2.5 |
| $S^{2-}$ | 1.1 | 0.06 |

TABLE 2

Goethite analysis

| Component | wt. % on dry |
|---|---|
| Fe | 37.4 |
| Pb | 1.7 |
| Si | 1.8 |
| Cu | 0.5 |
| Cd | 0.08 |
| As | 0.5 |
| Zn | 6.7 |
| $SO_4^{2-}$ | 1.8 |

EXAMPLE 1

For 1 part of wet goethite, 1 part by weight of blast furnace slags, and 0.5 part of converter slags are added. The slags are crushed to 150 μm or less. The ingredients are mixed and the necessary amount of water is added to obtain a stiff paste. This paste is hardened for 2 months under water. The obtained product is both very hard and inert. The results of the hardness and leachability tests are summarized in Table 3 below.

EXAMPLE 2

For 1 part of wet goethite, 0.5 part by weight of blast furnace slags, and 0.75 part of converter slags are added. The slags are crushed to 150 μm or less. The ingredients are mixed and the necessary amount of water is added to obtain a stiff paste. This paste is hardened for 2 months under water. The obtained product is both very hard and inert.

The results of the hardness and leachability tests are summarized in Table 3 below.

EXAMPLE 3

For 1 part of wet goethite, only 0.1 part by weight of blast furnace slags, and 0.5 part of converter slags are added. The slags are crushed to 150 μm or less. The ingredients are mixed and the necessary amount of water is added to obtain a stiff paste. This paste is hardened for 2 months under water. The obtained product is relatively hard and totally inert. The relative hardness makes this product nevertheless still suitable for building purposes, e.g. for road building. The results of the hardness and leachability tests are summarized in Table 3 below.

TABLE 3

Results for examples 1 to 3

| Example Number | Hardness $MNm^{-2}$ | Leachability mg/L | | | | | |
|---|---|---|---|---|---|---|---|
| | | Zn | Pb | As | Cu | Cd | Fe |
| 1 | 40 | <0.5 | <0.2 | <0.2 | <0.2 | <0.2 | <1 |
| 2 | 41 | <0.5 | <0.2 | <0.2 | <0.2 | <0.2 | <1 |
| 3 | 25 | <0.5 | <0.2 | <0.2 | <0.2 | <0.2 | <1 |

The hardness reported in the above table is the constrained hardness. The leachability reported in the above table is measured according to the DIN S4 norm.

What is claimed is:

1. Process for the conversion of iron bearing residues from the non-ferrous process industry into a synthetic rock, comprising the steps of:
   preparing a mixture consisting essentially of 1 part of wet iron bearing residue from the non-ferrous process industry mixed with at least 0.1 parts by weight of crushed blast furnace slags and with at least 0.1 parts by weight of crushed converter slags;
   adding water to the mixture to obtain a stiff paste; and
   allowing the past to harden, while keeping the paste wet, to such an extent that the resulting rock is usable for construction purposes.

2. Process according to claim 1, wherein the iron bearing residue is goethite.

3. Process according to claims 1 or 2, wherein for 1 part of the wet residue, a total amount of slags of at least 0.4 parts is used.

4. Process according to claims 1 or 2, wherein for 1 part of wet residue, at least 0.2 parts of each of both slags are used.

5. Process according to claims 1 or 2, wherein for 1 part of wet residue, no more than 2 parts of each of both slags are used.

6. Process according to claims 1 to 5, or 2, wherein for 1 part of wet residue, no more than 0.8 parts of each of both slags are used.

7. Process according to claims 1 to 6, characterized in that the slags are crushed to a particle size of less than 500 μm.

8. Process according to claims 1 or 2, wherein for 1 part of wet residue, up to 0.1 parts of cement is added, either to the mixture, or to the paste.

9. Process according to claims 1 or 2, further comprising breaking down the synthetic rock to yield gravel.

10. Process according to claims 1 or 2, wherein the said paste is first allowed to harden partially, is then broken down to gravel size, and then completely allowed to harden.

11. Process according to claims 1 or 2, wherein the said paste is allowed to harden while kept immersed under water.

12. Construction material containing the synthetic rock obtained by the process according to claims 1 or 2.

13. Process according to claims 1 or 2, wherein for 1 part of wet residue, at least 0.4 parts of each of both slags are used.

14. Process according to claims 1 or 2, wherein for 1 part of wet residue, no more than 1 part of each of both slags are used.

15. Process according to claims 1 or 2, wherein the slags are crushed to a particle size of less than 250 μm.

16. Process according to claims 1 or 2, wherein the slags are crushed to a particle size of less than 125 μm.

\* \* \* \* \*